US009263879B2

(12) United States Patent
Liehr et al.

(10) Patent No.: US 9,263,879 B2
(45) Date of Patent: Feb. 16, 2016

(54) THERMAL PROTECTION CIRCUIT

(71) Applicant: Thermik Geraetebau GmbH, Sondershausen (DE)

(72) Inventors: Hans-Christian Liehr, Sangerhausen (DE); Marcel P. Hofsaess, Sondershausen (DE)

(73) Assignee: THERMIK GERAETEBAU GMBH, Sondershausen (DE)

( * ) Notice: Subject to any disclaimer, the term of this patent is extended or adjusted under 35 U.S.C. 154(b) by 14 days.

(21) Appl. No.: 14/101,638

(22) Filed: Dec. 10, 2013

(65) Prior Publication Data

US 2014/0168844 A1    Jun. 19, 2014

(30) Foreign Application Priority Data

Dec. 18, 2012  (DE) .......................... 10 2012 112 487
Feb. 5, 2013   (DE) ..................... 20 2013 100 509 U

(51) Int. Cl.

| H02H 3/00 | (2006.01) |
|---|---|
| H02H 5/04 | (2006.01) |
| H01H 37/00 | (2006.01) |
| H01H 37/54 | (2006.01) |
| H01H 9/54 | (2006.01) |

(52) U.S. Cl.
CPC ............. *H02H 5/047* (2013.01); *H01H 9/541* (2013.01); *H01H 37/002* (2013.01); *H01H 37/5418* (2013.01); *H01H 37/5427* (2013.01); *H02H 5/04* (2013.01); *H01H 2037/5463* (2013.01)

(58) Field of Classification Search
USPC ....................... 361/93.7–93.9, 103, 106, 8–12
See application file for complete search history.

(56) References Cited

U.S. PATENT DOCUMENTS 3,549,970 A * 12/1970 Lewus .......................... 318/787
3,600,635 A    8/1971 Neilson
(Continued)

FOREIGN PATENT DOCUMENTS

| DE | 2 032 633 | 2/1971 |
|---|---|---|
| DE | 2 121 802 | 1/1973 |

(Continued)

OTHER PUBLICATIONS

International Search Report for PCT/EP2013/076026; mailed Mar. 27, 2014; 11 pp.

*Primary Examiner* — Danny Nguyen
(74) *Attorney, Agent, or Firm* — Harness, Dickey & Pierce, P.L.C.

(57) ABSTRACT

A thermal protection circuit has two electrical connection terminals for a device to be protected, and a temperature-dependent switch. The switch is provided with a temperature-dependent switching mechanism, two stationary contacts which are connected to the connection terminals, and a current transfer element, which is arranged on the switching mechanism. The current transfer element is moved by the switching mechanism and comprises two counter contacts, which are electrically connected to one another and in temperature-dependent bearing contact with the two stationary contacts. The thermal protection circuit is provided with a controllable semiconductor valve for AC voltage having two current terminals and a control input. Each of the two current terminals is connected to one of the connection terminals, and the control input is electrically connected to the counter contacts at the current transfer element via the switching mechanism at least when the temperature-dependent switch is closed.

28 Claims, 5 Drawing Sheets

(56) References Cited

U.S. PATENT DOCUMENTS

| | | | |
|---|---|---|---|
| 4,574,229 A * | 3/1986 | Kim | 318/788 |
| 5,905,620 A * | 5/1999 | Becher et al. | 361/105 |
| 6,249,211 B1 | 6/2001 | Hofsaess | |
| 2007/0252671 A1 | 11/2007 | Bischoff et al. | |
| 2013/0271258 A1 | 10/2013 | Hofsaess et al. | |

FOREIGN PATENT DOCUMENTS

| | | |
|---|---|---|
| DE | 2 253 975 | 5/1973 |
| DE | 31 32 338 A1 | 3/1983 |
| DE | 26 44 411 C2 | 8/1984 |
| DE | 198 27 113 C2 | 11/2001 |
| DE | 10 2004 036 117 A1 | 3/2006 |
| DE | 10 2007 042 903 A1 | 1/2009 |
| DE | 10 2011 016 142 A1 | 9/2012 |
| DE | 10 2011 100 752 A1 | 11/2012 |
| DE | 10 2012 103 306 B3 | 4/2013 |
| DE | 20 2013 100 509 U1 | 4/2013 |
| GB | 331372 | 7/1930 |
| GB | 1 394 612 | 5/1975 |
| GB | 2 458 650 | 9/2009 |
| JP | 1-303018 | 12/1989 |

\* cited by examiner

THERMAL PROTECTION CIRCUIT

BACKGROUND OF THE INVENTION

The present invention relates to a thermal protection circuit comprising two electrical connection terminals for a device to be protected, comprising a temperature-dependent switch, which comprises a temperature-dependent switching mechanism, two stationary contacts which are connected to the connection terminals, and a current transfer element, which current transfer element is arranged on the switching mechanism, is moved by the switching mechanism and comprises two counter contacts, which counter contacts are electrically connected to one another, are in temperature-dependent bearing contact with the two stationary contacts and thereby connect said stationary contacts electrically conductively to one another.

A temperature-dependent switch which can be used in the thermal protection circuit is known from DE 26 44 411 C2.

The known switch has a housing with a cup-like lower part, into which a temperature-dependent switching mechanism is inserted. The lower part is closed by an upper part, which is held on the lower part by the upstanding rim of the lower part. The lower part can be manufactured from metal or insulating material, while the upper part consists of insulating material.

Two contact rivets, whose inner heads act as stationary contacts for the switching mechanism, rest in the upper part. The rivet shafts protrude outwards through through-openings in the upper part and merge there with outer heads, which are used for the external terminal connection of the known switch. Connecting litz wires can be soldered directly to these outer heads, wherein it is also known to hold angular contacts on the outer heads, to which angular contacts connecting litz wires are soldered or crimped.

The switching mechanism bears a current transfer element in the form of a contact bridge, two counter contacts being provided on the upper side of said contact bridge, which counter contacts are electrically connected to one another via the contact bridge, are brought into bearing contact with the two stationary contacts, depending on the temperature, and then electrically connect said stationary contacts to one another.

The temperature-dependent switching mechanism has a bimetallic snap-action disc and a spring snap-action disc, through which discs a pin passes centrally which bears the contact bridge. The spring snap-action disc is fixed circumferentially in the housing, while the bimetallic snap-action disc is supported on a shoulder of the lower part or on the rim of the spring snap-action disc, depending on the temperature, and in the process either enables the bearing contact of the contact bridge on the two stationary contacts or else lifts the contact bridge off from the stationary contacts, with the result that the electrical connection between the external terminals is interrupted.

This temperature-dependent switch is used in a known manner to protect electrical devices from overheating. For this, the switch is connected electrically in series with the device to be protected and the AC supply voltage thereof and is arranged mechanically on the device in such a way that it is in thermal contact therewith.

Below the response temperature of the bimetallic snap-action disc, the contact bridge bears against the two stationary contacts, with the result that the circuit is closed and the load current of the device to be protected flows via the switch. If the temperature increases beyond a permissible value, the bimetallic snap-action disc lifts off the contact bridge from the stationary contacts, counter to the actuating force of the spring snap-action disc, as a result of which the switch is opened and the load current of the device to be protected is interrupted.

The now de-energized device can then cool down again. In the process, the switch which is thermally coupled to the device also cools down again and then automatically closes again.

Owing to the dimensioning of the contact bridge, the known switch is capable of conducting much higher operating currents in comparison with other temperature-dependent switches in which the load current of the device to be protected flows directly via the bimetallic snap-action disc or a spring snap-action disc associated therewith, with the result that said switch can be used for protecting larger electrical devices with a high power consumption.

As already mentioned, the known switch automatically switches on again after cooling down of the device protected thereby. While such a switching response can be entirely expedient for protecting a hairdryer, for example, overall this is not desirable where the device to be protected should not automatically switch on again once it has been switched off in order to avoid damage. This applies, for example, to electric motors which are used as drive assemblies.

DE 198 27 113 C2 therefore proposes providing a so-called self-holding resistor, which is electrically in parallel with the external terminals. The self-holding resistor is electrically in series with the device to be protected when the switch is open, with now only a nonhazardous residual current flowing through said device owing to the resistance value of the self-holding resistor. This residual current is sufficient, however, for heating the self-holding resistor to such an extent that it emits heat which keeps the bimetallic snap-action disc above its switching temperature.

The switch known from DE 198 27 113 C2 can also be equipped with a current-dependent switching function, for which purpose a heating resistor is provided, which is connected permanently in series with the external terminals. The load current of the device to be protected therefore flows constantly through this heating resistor, which can be dimensioned such that, when a specific load current intensity is exceeded, it ensures that the bimetallic snap-action disc is heated to a temperature above its response temperature, with the result that the switch already opens in the event of an increased load current before the device to be protected has been heated to an impermissible extent.

Such switches have proven reliable for everyday use. They are used in particular for the protection of electrical devices with a high power consumption because they can conduct high currents via the contact bridge. When such switches do not open at the zero crossing of the AC supply voltage, arcs form between the stationary contacts and the counter contacts in the event of the contact bridge being lifted off from the stationary contacts, and the voltage drop across the switch is reduced to the arc voltage. The voltage drop remains at this level until the applied AC supply voltage changes polarity, i.e. reaches its next zero crossing. Then, the arcs are quenched and the switch is reliably opened.

In the conventional application cases of the known switch with a high switching power, a load current with a high current intensity needs to be interrupted, which means that strong arcs form which in turn results in contact erosion and therefore, as a consequence, long term in a change in the geometry of the switching areas and often also in impairment of the switching response.

In the case of uncontrolled flashover in the interior of the switch, arcs can even cause damage to the bimetallic snap-action disc. In addition, arcs can result in the switching areas on the stationary contacts and the counter contacts sticking together, so to speak, and the contact bridge not detaching or no longer detaching quickly enough from the stationary contacts.

These problems are increased with the number of switching cycles even more, with the result that the switching response of the known switch is impaired over the course of time. Against this background, the life period, i.e. the number of permissible switching cycles of the known switches, is limited, wherein the life period is also dependent on the switching power, i.e. the current intensity of the switched currents.

Switches of the generic type by the applicant have, for example, on an AC supply voltage of 250 volts a conventional life of 10 000 switching cycles given a load current of 10 amperes and 2000 switching cycles given a load current of 25 amperes.

Against this background, there is a need for temperature-dependent switches with an increased switching power and an extended life period.

It is known that the formation of arcs cannot be avoided, but that the damage caused by these arcs can be reduced and retarded by corresponding formation of the switching areas. For this, particular geometries and materials need to be used for the contacts, what makes the design of the known switches complex and cost-intensive.

In order to protect the bimetallic snap-action disc from damage as a result of jumping arcs, in addition the design of the known switch is such that the bimetallic snap-action disc is shielded by the spring snap-action disc and the contact bridge with respect to arcs which are produced during opening of the switch.

Although these protective measures have proven successful overall, they cannot wholly prevent the damage associated with the formation of arcs, which limits the life period and switching power of the known switches to the above-mentioned values which are conventional in particular in the case of switches by the applicant.

In addition, a disadvantage consists in that the described measures are complex and cost-intensive.

In connection with relays and contactors, it is known that arcs can be influenced by electromagnetic fields and can be quenched by capacitive and inductive components in the circuit. Furthermore, it is known to guide an arc occurring in contactors by means of so-called permanent magnet blowout such that the arc is quenched quickly.

Further, DE 31 32 338 A1 discloses connecting a controllable semiconductor valve, for example a triac, in parallel with a contactor comprising two fixed contacts and a linearly moveable contact bridge by virtue of the current terminals of said semiconductor valve being connected to the fixed contacts. The control input of the triac is connected to a terminal at the contact bridge via a series resistor and a flexible line, which leads into the interior of the contactor, which terminal is positioned between the contact points with the fixed contacts.

When the contactor is closed, the voltage drop across the contact points needs to be so low that no effective control current for the triac is formed between the control terminal and its reference terminal, which corresponds to one of the two current terminals. The triac is then not conducting, i.e. remains de-energized.

If the contactor opens as a result of external driving, two arcs are produced which must result in such a high arc voltage for a sufficient time span that the contact bridge to the reference terminal has a sufficient potential difference until a control current flows through the series resistor which can trigger the triac. Once the triac has been triggered, i.e. is conducting, it takes up the load current flowing through the contactor, whereupon the arcs are quenched.

By virtue of the rapid electromagnetic actuation of the contact bridge, said contact bridge moves sufficiently far away from the fixed contacts so quickly that renewed triggering of the triac cannot take place once the load current has been interrupted at the zero crossing of the AC supply voltage.

This method therefore has three critical conditions. The voltage drop across the contact points should not be too great when the switch is closed and should not be too low for a specific period of time when the switch is open. In addition, the interrupting speed should be so great that the triac is not triggered again. In addition, it is at least problematic in design terms that a flexible line needs to be guided into the interior of the contactor.

DE 2 253 975 A discloses a circuit wherein an arc forming on opening of a temperature-dependent switch in an AC circuit is quenched by a triac connected in parallel to said switch. The temperature-dependent switch used is a change-over switch having a central contact, which central contact is connected in temperature-dependent fashion either to a main contact arranged in a load circuit of the load, or to an auxiliary contact permanently connected to the control input of the triac. When the auxiliary contact is closed, a permanent residual current is flowing leading to power loss.

SUMMARY OF THE INVENTION

In view of this prior art, it is therefore one object of the present invention to improve in the case of the thermal protection circuit mentioned at the outset the life period and/or switching power of the temperature-dependent switch in a manner which is simple in design terms and inexpensive.

According to the invention, this and other objects are achieved in the thermal protection circuit mentioned at the outset in that said thermal protection circuit comprises a controllable semiconductor valve for AC voltage having two current terminals and a control input, wherein each of the two current terminals is connected to one of the connection terminals, and the control input is electrically connected to the counter contacts at the current transfer element via the switching mechanism at least when the temperature-dependent switch is closed.

The inventors of the present application have been able to demonstrate in extensive tests that the principle of arc quenching described in the above-mentioned DE 31 32 338 A1 can surprisingly also be used in existing temperature-dependent switches of the kind mentioned at the outset. That is to say that if the control input of the semiconductor valve is connected preferably to the switching mechanism of the switch via the lower part and to the counter contacts on the current transfer element via the switching mechanism, in the case of the switch known from DE 26 44 411 C2 it is connected electrically to the contact bridge via the spring snap-action disc and/or the bimetallic snap-action disc and via said contact bridge to the counter contacts. Owing to the fact that in this case the contact bridge itself is electrically conductive, the control input is connected to the two counter contacts provided on said contact bridge and therefore is at the electrical potential of the two counter contacts.

However, the contact bridge itself does not need to be electrically conductive; it is sufficient if the counter contacts provided on said contact bridge are connected electrically to one another and to the switching mechanism, with the result that the switching mechanism is at the potential of the counter contacts.

When the temperature-dependent switch is closed, this potential corresponds to the potential of the AC supply voltage at the reference current terminal of the semiconductor valve, with the result that no control current is produced for the semiconductor valve. If the temperature-dependent switch opens, arcs begin to form when the contact bridge is lifted off from the stationary contacts, and these arcs rapidly reach an arc voltage of 10 volts. As a result, a sufficiently high and long-lasting control current is produced for the semiconductor valve, which results in triggering of the semiconductor valve, which then opens.

As soon as the semiconductor valve is triggered, it takes up the load current and the temperature-dependent switch becomes de-energized, with the result that the arcs are quenched. The semiconductor valve closes again when the AC operating voltage reaches the zero crossing. During this time span, the contact bridge has moved so far away from the stationary contacts that flashover and renewed formation of arcs do not occur.

In this case, it is advantageous in design terms that no moveable cable needs to be guided into the interior of the switch to the current transfer element, but that, in unexpected fashion, the temperature-dependent switching mechanism can produce the electrical connection between the control input of the semiconductor valve and the counter contacts on the current transfer element. Surprisingly, the above-mentioned demands placed on the voltage drops and the switching speed are met here.

By virtue of the use according to the invention of a controllable semiconductor valve for AC voltage, surprisingly not only the arcs are quenched quickly, but also the switching power and the life period of existing temperature-dependent switches are markedly increased.

In the case of the switch by the applicant mentioned at the outset, no impairment of the switching response could be established when the load current was doubled to 50 amperes even after 20,000 switching cycles.

Thus, existing temperature-dependent switches of the type described at the outset can be used for relatively high switching powers without any design changes and even then demonstrate longer live periods than in a thermal protection circuit without an arc-quenching semiconductor valve.

These existing switches have, in one configuration, a spring snap-action disc, which can be manufactured from a bimetallic strip, and bears the current transfer element and is connected permanently mechanically and electrically to the lower part. In this case, the electrically conductive current transfer element is therefore connected permanently to the control input of the semiconductor valve.

However, designs with a bimetallic and spring snap-action disc are also known in which the spring snap-action disc is no longer electrically connected to the lower part at least after complete opening of the switch because it changes from its convex shape to its concave shape. At the beginning of the opening operation, the spring snap-action disc does, however, push with its rim further inwards on the lower part, while the bimetallic snap-action disc already begins to lift off the current transfer element from the stationary contacts, counter to the force of the spring snap-action disc which is gradually pressed flat in the process, with the result that the arcs form.

Only when the bimetallic snap-action disc has pressed the spring snap-action disc sufficiently flat does the spring snap-action disc snap over. Up to this point in time, however, it is electrically connected to the lower part, with the result that the control current can pass to the control input. Surprisingly, the time period up to this point in time is sufficient for triggering the semiconductor valve.

For the use according to the invention of the semiconductor valve, it is therefore not necessary for the control input to be connected permanently electrically to the switching mechanism. It is merely important that this connection exists, at least when the switch is closed and thereafter, until the semiconductor valve is triggered, i.e. is turned on.

The inventors of the present application have for the first time identified that certain existing temperature-dependent switches provide an electrical connection between the counter contacts on the current transfer element and the lower part which is maintained at the beginning of an opening operation at least for a length of time sufficient for a semiconductor valve to be capable of being triggered by arcs forming.

For this, the semiconductor valve merely needs to be connected in parallel with the feed lines to the temperature-dependent switch at a suitable point. In addition, only a control line from the control input to the switching mechanism is further required. The semiconductor valve can in this case be fitted wherever there is corresponding installation space available. In addition, the installation space can be selected such that the semiconductor valve is not arranged in the interior of coil windings, but wherever relatively low temperatures prevail which do not impair the function of the semiconductor valve.

The semiconductor valve thus does not need to be arranged directly at the device. Therefore, it may be—e.g. via a plug—be mounted at the device only when the temperature-dependent switch has been mounted at the device and the device has been impregnated, what is especially advantageous with electric motors and coils.

It is one advantage of this measure that the semiconductor valve can be retrofitted and/or exchanged at any point in time.

It is one object of the present invention to use temperature-dependent switches with a simple design which are therefore inexpensive for switching powers for which they are not suited without the additional semiconductor valve.

Thereby, for the first time temperature-dependent switches can be reliably used for high current strengths, which as current transfer element do not comprise a contact plate but a spring part that carries both counter contacts or at which both counter contacts are embodied. The spring part can be a bimetallic part, especially a bimetallic snap-action disc, which not only provides the temperature-dependent switching function but simultaneously also conducts the current when the switch is closed.

Because according to the invention the arcs forming on opening of the switch at the two counter contacts are very quickly quenched again by the semiconductor valve, the bimetallic disc is not or only so slightly damaged upon opening of the switch, that as compared to usage without semiconductor valve the life period and the permissible switching power of these temperature-dependent switches of very simple construction is remarkably increased.

Thus, the inventors have not taken the path previously taken in the pri- or art, namely that of further optimizing the design of the known switches in respect of the problems associated with arcs, but have selected the path which at first glance is unconventional and also does not promise success, namely that of additionally using a semiconductor valve, although this in addition also results in additional costs.

The additional costs are, however, according to the knowledge of the inventors, more than absorbed by virtue of the fact that not only the life period of existing temperature-dependent switches is increased, but that existing switches, contrary to expectations, can now be used for higher switching powers.

The inventors have therefore provided a circuit which effects electronic arc quenching in an AC circuit for temperature-dependent switches with a bimetallic switching mechanism of the kind mentioned at the outset.

A "controllable semiconductor valve" in the context of the present invention is understood as meaning a semiconductor component which—without a control signal at its control input—blocks an AC voltage applied to its current terminals and switches on, i.e. is turned on or in other words opens, when a control voltage is applied. In particular embodiments, the semiconductor valves also remain turned on when the control current is disconnected, but close again when the AC voltage applied reaches its zero crossing, i.e. changes its polarity.

A thermal protection circuit according to the invention is connected into the AC supply circuit of an electrical device to be protected from overheating, wherein the semiconductor valve and at least one temperature-dependent switch are interconnected between the two connection terminals.

According to a further object, the semiconductor valve is a triac, i.e. a bidirectional thyristor triode, as is used, for example, for phase-gating control. The semiconductor valve can be in the form of an electronic component with a semiconductor layer structure and three terminals. However, it is also possible for the semiconductor valve to be constructed from discrete components which, in combination, perform the function of a triac.

According to another object, the temperature-dependent switching mechanism comprises a spring part, which bears the current transfer element and is electrically conductively connected thereto and is electrically connected to the control input at least when the temperature-dependent switch is closed.

Preferably, the switch has a housing, which accommodates the switching mechanism and has a lower part and an upper part, with the stationary contacts being arranged on the inner side of said upper part.

The spring part can be an elongate bimetallic arm or a spring arm which bears, at its free end, the current transfer element and, at its other end, is fixed to the housing and is formed with a terminal there for the control input. If the spring part is a spring arm, a bimetallic part is associated therewith, which bimetallic part moves the free end of the spring arm away from the stationary contacts in temperature-dependent fashion so that the switch opens. In these embodiments, the control input is permanently connected to the temperature-dependent switching mechanism.

According to a still further object, the spring part is a bimetallic snap-action disc, which bears the current transfer element centrally and is supported on the lower part at least when the temperature-dependent switch is closed.

According to another object, the spring part is a spring snap-action disc, which is supported on the lower part at least when the temperature-dependent switch is closed, wherein a bimetallic snap-action disc is provided which lifts off the current transfer element from the stationary contacts above the switching temperature of said bimetallic snap-action disc.

These measures are advantageous in design terms since they use an existing switch as the temperature-dependent switch.

While it is quite sufficient for only a bimetallic snap-action disc to be provided which both produces the contact pressure and ensures temperature-dependent opening, the bimetallic snap-action disc can be relieved of mechanical load in its low-temperature position by a spring snap-action disc, which, in addition to the bimetallic snap-action disc or on its own, effects the contact pressure, which contributes to greater long-term stability of its switching response.

The low current which is required for triggering the semiconductor valve can be conducted both through the spring snap-action disc and through the bimetallic snap-action disc owing to initial endurance tests at the premises of the applicant.

The lower part can be manufactured from an electrically conductive material or from an insulating material. If the lower part is manufactured from an insulating material, it has an electrode on its base, on which electrode the bimetallic snap-action disc and/or spring snap-action disc is supported and which electrode is passed out of the lower part and is connected there to the control input.

If the lower part itself is electrically conductive, on the other hand, the control input merely needs to be connected to the lower part on the outside, which is advantageous in design terms.

When the spring part is permanently electrically connected to the lower part, it is ensured in a manner which is simple in design terms and inexpensive that arcs produced during an opening operation result in a control current to the control input.

It is a further object that a self-holding resistor is connected between the stationary contacts, wherein preferably a heating resistor is connected between one of the stationary contacts and the associated connection terminal.

It is advantageous here that self-holding switches and/or switches with a defined current dependency can be used. The inventors of the present application have identified on the basis of tests that, contrary to expectations, a self-holding resistor and/or a heating resistor do/does not impair the use according to the invention of the semiconductor valve.

It is a still further object that the current transfer element is an electrically conductive contact plate, on which the two counter contacts are arranged, which are electrically connected to one another via the contact plate, wherein the contact plate is electrically conductively connected to the switching mechanism.

This measure is likewise advantageous in design terms. The contact plate can have the counter contacts on its upper side, which can be formed by two coated contact areas on the upper side. The upper side of the contact plate can also itself form the counter contacts, or can be formed continuously as a contact area, as is described in DE 10 2011 016 142 A1.

The contact plate can be in the form of a circular contact disc or an elongate contact bridge.

As already mentioned, the current transfer element can also be a spring part, especially a bimetallic snap-action spring at which the counter contacts are provided or embodied, which counter contacts are electrically conductively to each other by the spring part.

The spring part is then preferably permanently connected to the control input of the semiconductor valve. This can be effected via the electrically conductive lower part of the temperature-dependent switch or via an additional support electrode which carries the bimetallic snap-action spring at its center and protrudes out of the housing of the temperature-dependent switch where it is connected to the control input.

According to another object, instead of a temperature-dependent switch with two stationary contacts which is in the form of a two-pole normally closed contact, two single-pole temperature-dependent switches are used in the thermal protection circuit, with each of these switches having two external terminals. These switches are connected electrically in series via in each case one external terminal, with the result that in each case one further external terminal of a switch acts as connection terminal for the thermal protection circuit. This arrangement is also referred to as a twin arrangement. In this twin circuit, all conventional temperature-dependent switches can be used which are single-pole normally closed contacts.

According to one object, the current terminals of the semiconductor valve are connected to the two connection terminals, and the control input is connected to the external terminals, which are connected to one another, in order to ensure electronic arc quenching.

If the two temperature-dependent switches open within a half-cycle of the AC supply voltage, the arc voltage of the arcs forming results in triggering of the semiconductor valve, which closes and takes up the load current, with the result that the arcs are quenched.

According to a further object, there is provided a thermal protection circuit comprising two electrical connection terminals for a device to be protected, comprising two temperature-dependent switches, which each have a temperature-dependent switching mechanism, which produces or opens, in temperature-dependent fashion, an electrical connection between two external terminals, wherein in each case one external terminal of one switch is connected to one of the connection terminals or acts as connection terminal, and the respective other external terminals of the switches are connected to one another, wherein a controllable semiconductor valve for AC voltage comprising two current terminals and a control input is provided, and each of the two current terminals is connected to one of the connection terminals, and the control input is electrically connected to the external terminals, which are connected to one another.

The advantages associated with the invention, in addition to the higher switching power and longer life period of the temperature-dependent switches used, also consist in that the semiconductor valve, in particular the triac, only conducts the load current for a short period of time when the arc is produced, with the result that excessive heating of the triac does not occur. Cooling for the semiconductor valve is not required.

During "normal" continuous operation, the load current is conducted through the temperature-dependent switch, which likewise does not require any cooling.

Further advantages result from the description and the attached drawing.

It goes without saying that the features mentioned above and yet to be explained below can be applied not only in the respectively cited combination, but also in other combinations or on their own, without departing from the scope of the present invention.

BRIEF DESCRIPTION OF THE DRAWINGS

Embodiments of the invention will be illustrated in the attached drawing and are explained in more detail in the description below. In the drawing.

DESCRIPTION OF PREFERRED EMBODIMENTS

Figure 1:
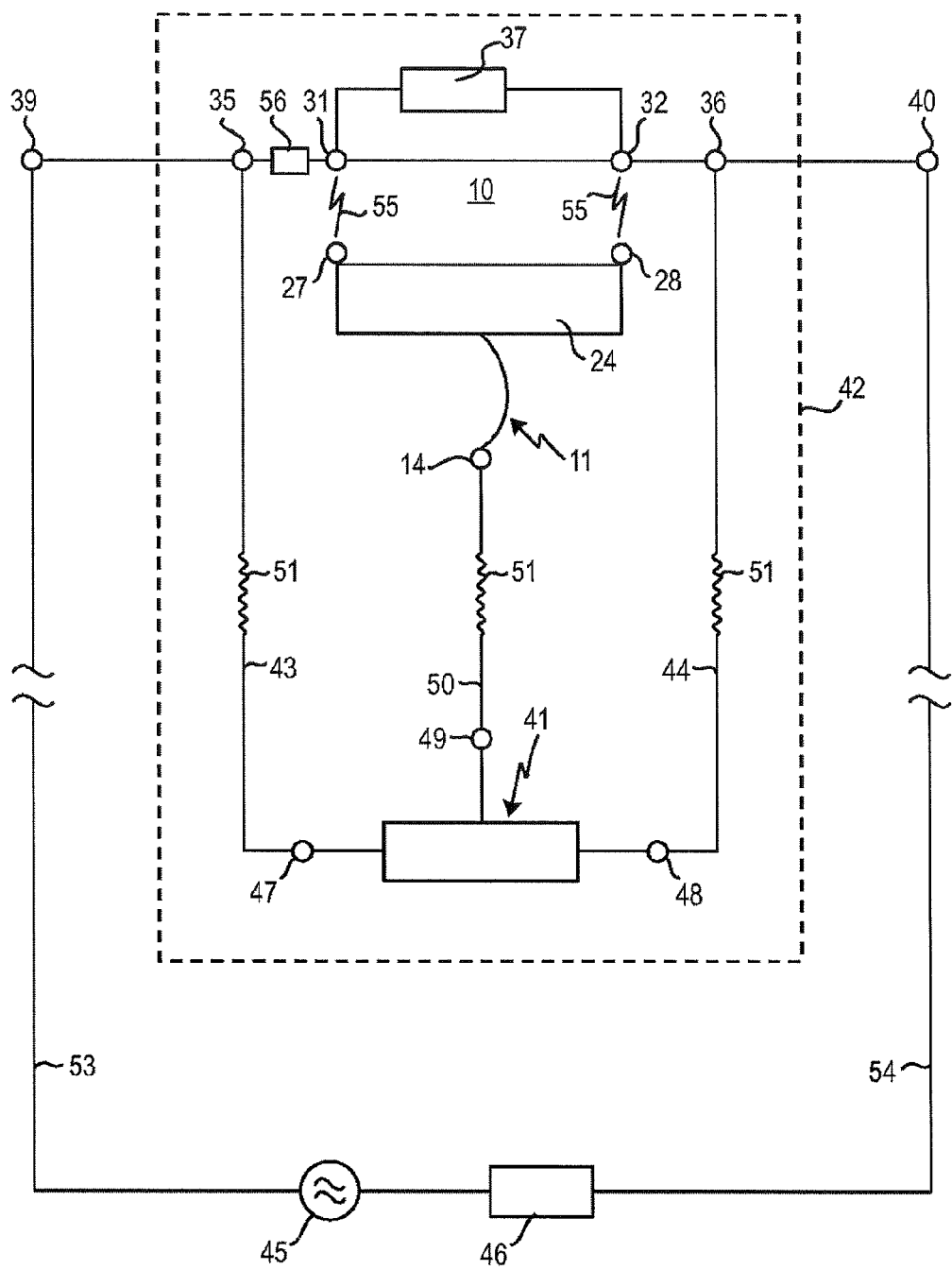
FIG. 1 shows a schematic longitudinal section (not true to scale) through a temperature-dependent switch, as can be used in the novel thermal protection circuit shown in FIG. 2.

In FIG. 1, 10 denote a temperature-dependent switch which comprises a temperature-dependent switching mechanism 11 which is accommodated in a housing 12.

The housing 12 comprises a lower part 14 consisting of an electrically conductive material and an upper part 15 consisting of an insulating material, which upper part 15 closes said lower part and is held on said lower part by a flanged rim 16 of the lower part 14. Between the lower part 14 and the upper part 15 a ring 17 is arranged, which ring is supported on a shoulder 18 of the lower part 14 and there clamps in a spring snap-action disc 21 of the switching mechanism 11 at its rim, which spring snap-action disc is therefore permanently electrically conductively connected to the lower part 14.

The switching mechanism 11 comprises, in addition to the spring snap-action disc 21, also a bimetallic snap-action disc 22, which bimetallic snap-action disc together with the spring snap-action disc 21 is centrally passed by a pin-like rivet 23, by means of which rivet said snap-action discs are mechanically and electrically connected to a current transfer element in the form of a contact plate 24 manufactured from an electrically conductive material. The rivet 23 has a first shoulder 25, on which the bimetallic snap-action disc 22 rests with radial and axial play, wherein a second shoulder 26 is provided, on which the spring snap-action disc 21 likewise rests with radial and axial play.

The bimetallic snap-action disc 22 is supported with its peripheral rim on the inside in the lower part 14.

The contact plate 24 has, in the direction of the upper part 15, two large-area counter contacts 27 and 28, which are electrically connected to one another via the contact plate 24 and which interact with two stationary contacts 31, 32 arranged on the inner side 29 of the upper part 15, which stationary contacts are inner heads of contact rivets 33, 34, which pass through the upper part 15 and, with their outer heads, act as external terminals 35, 36.

In the switching position shown in FIG. 1, spring snap-action disc 21 and bimetallic snap-action disc 22 press said contact plate 24 against the stationary contacts 31 and 32, which are thus connected to one another via said counter contacts 27, 28; thus, the switch 10 is closed.

If the temperature of the bimetallic snap-action disc 22 increases beyond its response temperature, its snaps over from the convex shape shown into a concave shape and in the process is supported with its rim in the region of the ring 17 and pulls the contact plate 24 away from the stationary contacts 31, 32 counter to the force of the spring snap-action disc 21; the switch 10 is now open.

The switch described to this extent is known from DE 26 44 411 C2 and DE 198 27 113 C2. If the temperature now decreases again, the switch known from DE 26 44 411 C2 would again snap back into the closed state shown in FIG. 1.

In order to prevent this undesired renewed making, a schematically indicated self-holding resistor 37 is provided on the inner side of the upper part 15, which self-holding resistor is connected electrically in series between the two stationary contacts 31, 32 and, when the switch 10 is open, conducts a residual current, by means of which it is heated to such an extent that the bimetallic snap-action disc 22 is kept at a temperature above its return temperature.

While the contact plate 24 in the embodiment shown is moved by a temperature-dependent switching mechanism 11 comprising a circular spring snap-action disc 21 and a circular bimetallic snap-action disc 22, it is also possible to dispense with the spring snap-action disc and to hold and move the contact plate 24 merely by means of a bimetallic snap-action disc 22. In addition, instead of a circular contact plate 24, an elongate contact bridge can also be used.

While in the embodiment shown the contact plate 24 is held centrally by the bimetallic snap-action disc 22 and the spring snap-action disc 21, it is also possible to use an elongate bimetallic spring which is clamped in at one end, which elongate bimetallic spring bears a contact bridge at its free end, as is known, for example, from DE 10 2004 036 117 A1.

Figure 2:
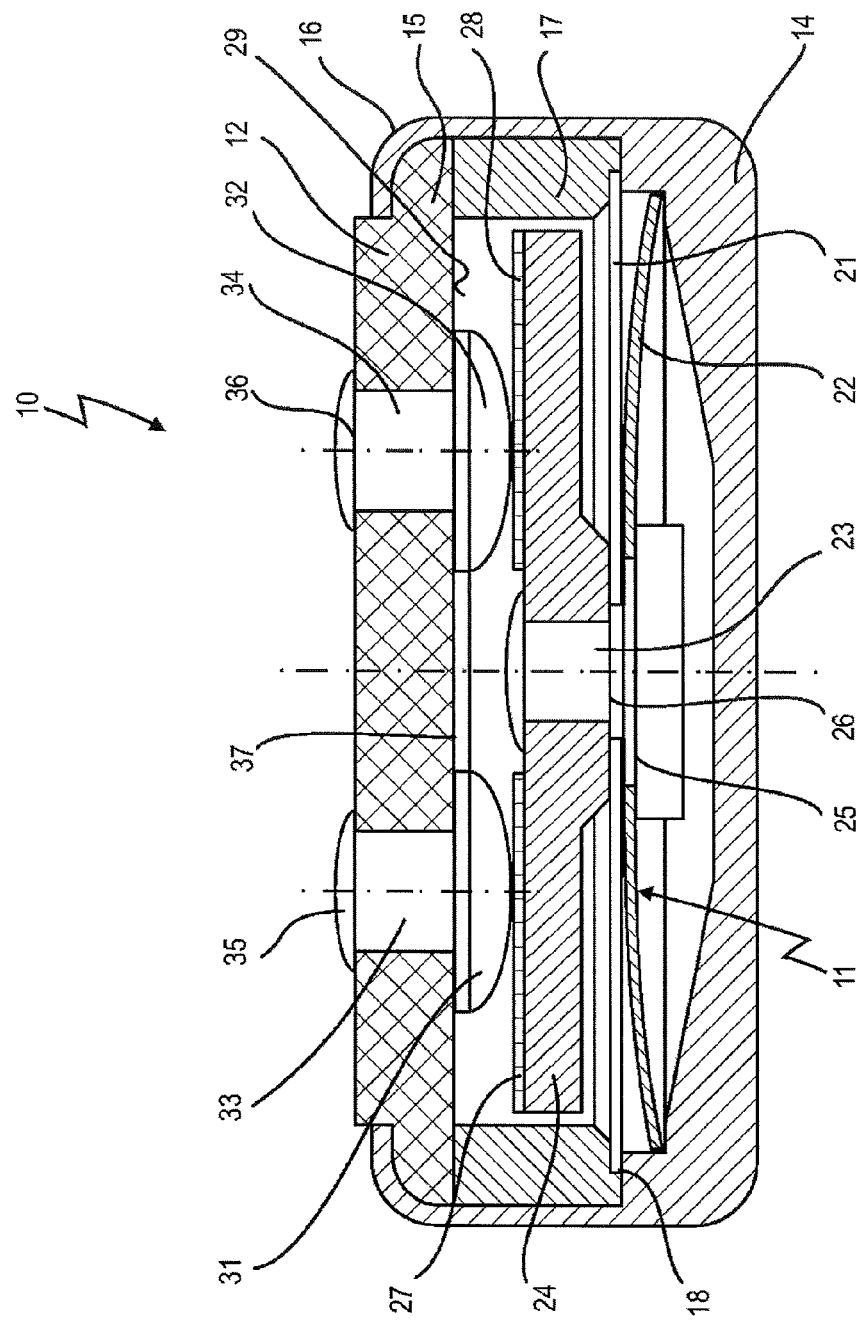
FIG. 2 shows a schematic illustration of a first embodiment of the novel thermal protection circuit, in which the switch shown in FIG. 1 is used.

In FIG. 2, between two connection terminals 39, 40, the temperature-dependent switch 10 shown in FIG. 1 is interconnected with a controllable semiconductor valve 41 to form a thermal protection circuit 42 bordered by dashed lines, which thermal protection circuit is connected via the connection terminals 39, 40 to a series circuit comprising an AC voltage source 45 and an electrical device 46 to be protected.

Switch 10 is indicated merely schematically in FIG. 2; the schematically indicated design features are provided with the reference symbols as in FIG. 1. Two connecting lines 43, 44 are connected to the two external terminals 35, 36 of the switch 10, which are in turn connected to the stationary contacts 31, 32, which are short-circuited via the contact plate 24 in the switching position shown in FIG. 1, which contact plate is borne by the switching mechanism 11. The external terminals 35, 36 are connected to the connection terminals 39 and 40, respectively, of the thermal protection circuit 42.

The contact plate 24 is electrically connected to the lower part 14 via the switching mechanism 11, i.e. in this case the spring snap-action disc 21, which lower part is characterized by a circle as a terminal in FIG. 2. The semiconductor valve 41 has two current terminals 47, 48, which are each connected to one of the connecting lines 43, 44. In addition, the semiconductor valve 41 has a control input 49, which is connected to the lower part 14 via a control line 50.

Rippled sections 51 in the connecting lines 43, 44 and the control line 50 indicate that the semiconductor valve 41 can be connected to the connecting lines 43, 44 at any suitable point. The rippled sections 51 can be embodied as a plug.

With existing or permanent wiring of the switch 10 to the AC voltage source 45 and the device 46, the semiconductor valve 41 can therefore be connected as desired to the connecting lines 43, 44 or to external lines 53, 54, which lines do not need to be newly laid for this purpose, but merely need to be stripped of insulation at the appropriate point for the connection to the current terminals 47, 48. Only the control line 50 still needs to be laid to the switch 10 and connected there externally to the lower part 14, as a result of which the electrical connection to the switching mechanism 11 and, via said switching mechanism, to the contact plate 24 is produced.

In this way, an existing switch 10 can be connected to the semiconductor valve 41 which, in the manner outlined at the outset, ensures that the arcs forming on opening of the switch 10 between the counter contacts 27, 28 and the stationary contacts 31, 32 are quenched very quickly, with these arcs being denoted schematically in FIG. 2 by 55. FIG. 2 shows the switch 10 in a switching state in which the contact plate 24 is just moving away from the stationary contacts 31, 32.

When the temperature-dependent switch 10 opens, as shown in FIG. 2, the arcs 55 begin to develop when the contact plate 24 lifts off from the stationary contacts 31, 32, which arcs quickly reach an arc voltage of 10 volts. As a result, a sufficiently high and long-lasting control current for the semiconductor valve 41 is produced, which current flows via the contact plate 24, the spring snap-action disc 21 and the lower part 14 into the control line 50 and therefore results in triggering of the semiconductor valve 41.

As soon as the semiconductor valve 41 is triggered, i.e. becomes conducting, said semiconductor valve takes up the load current and the temperature-dependent switch 10 is de-energized, with the result that the arcs 55 are quenched. The semiconductor valve 41 closes again when the AC operating voltage 45 reaches the zero crossing, i.e. changes polarity. During this time span, the contact plate 24 has been moved so far from the stationary contacts 31, 32 that there is no flashover or renewed formation of arcs.

The self-holding resistor 37 now takes up a residual current, which keeps the switch 10 open even after the device 46 has cooled down.

FIG. 2 also shows a heating resistor 56, which is connected in series between the stationary contact 31 and the external terminal 35, i.e. one of the connection terminals of the thermal protection circuit 42.

Neither the self-holding resistor 37 nor the heating resistor 56 impairs the interaction between the switch 10 and the semiconductor valve 41 which is used in accordance with the invention.

While the lower part 14 is electrically conductive in the case of the switch 10 shown in FIG. 1, it can also be manufactured from insulating material. In order that the switching mechanism 11 can nevertheless be connected to the control input 49, an additional electrode is required which produces the connection to the switching mechanism 11. This can be a lug passed out towards the side at shoulder 18 in the case of the design shown in FIG. 1.

When the contact plate 24 is arranged on a free end of a bimetallic spring, this can be an electrode which is connected to the other, clamped-in end of the bimetallic spring.

The two external terminals 35 and 36 can also simultaneously act as connection terminals 39 and 40, respectively. The external lines 53, 54 can also be formed by the connecting lines 43 and 44, respectively, which, for this purpose, are routed on to the device 46 and the AC voltage source 45.

Instead of a switch 10 with two simultaneously opening contact pairs 27/31 and 28/32, two single-pole temperature-dependent switches can also be used, as are described, for example, in DE 21 21 802 A and other intellectual property rights owned by the present applicant.

Figure 3:
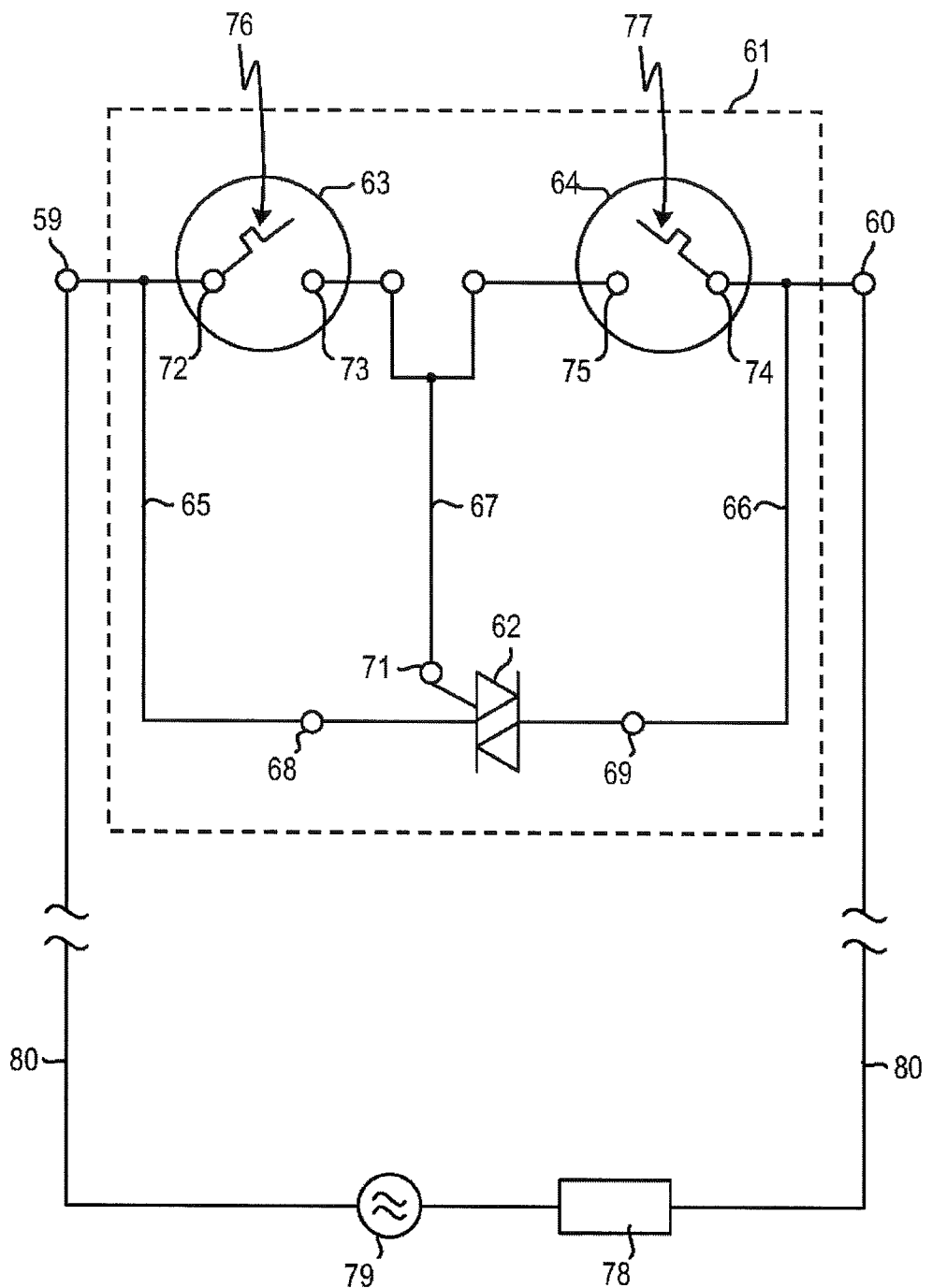
FIG. 3 shows a second embodiment of the thermal protection circuit shown in FIG. 2, in which two single-pole temperature-dependent switches are used, of which one is shown in FIG. 4.

FIG. 3 shows—between two connection terminals 59, 60—a thermal protection circuit 61, in which circuit a semiconductor valve in the form of a triac 62 is connected to two single-pole temperature-dependent switches 63, 64 via two connecting lines 65, 66 and a control line 67. The switches 63 and 64 are interconnected as a so-called twin.

The triac 62 has two current terminals 68, 69 and a control input 71.

Each switch 63, 64 has two external terminals 72, 73 and 73, 74, respectively. The external terminals 73 and 75 are connected to one another and to the control input 71 via the control line 67. The external terminals 72 and 74 are connected to the connection terminals 59 and 60, respectively, and to the connecting lines 65 and 66, respectively.

Each switch 63, 64 also has a switching mechanism 76 and 77, respectively, which is connected to the triac 62 via the external terminals 73 and 75, respectively. When the switching mechanisms 76, 77—within the same half-cycle of the AC supply voltage 79—open as a result of overheating of a device 78 connected to the connection terminals 59, 60, a comparable function results as in the case of the thermal protection circuit 41 shown in FIG. 2. External lines 80 are used for connecting the thermal protection circuit 61, the device 78 and the AC voltage source 79 in series with one another.

Owing to the protective function of the triac used according to the invention, temperature-dependent switches 63, 64 with a very simple design can be used for the thermal protection circuit 61 shown in FIG. 3, which switches are actually only designed for low switching powers. Since the triac 62 ensures, in the described way, that arcs which arise are quenched again very quickly, however, these switches can be used for relatively high switching powers and in addition also have a relatively long life.

The two external terminals 72 and 74 can also simultaneously act as connection terminals 59 and 60, respectively. The external lines 80 can also be formed by the connecting lines 65 and 66, which, for this purpose, are passed on to the device 78 and the AC voltage source 79.

Figure 4:
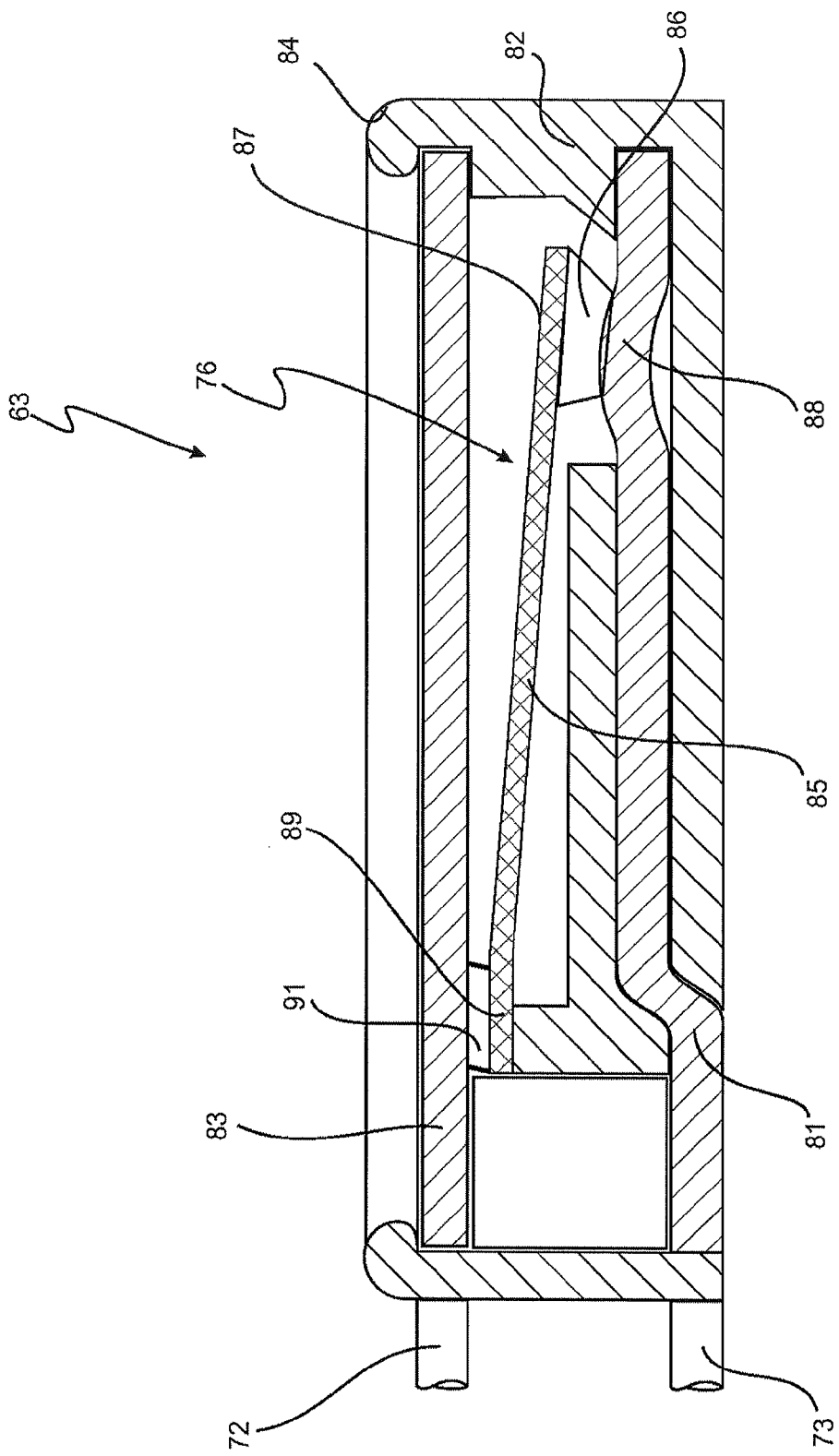
FIG. 4 shows a single-pole temperature-dependent switch, as is used in the thermal protection circuit shown in FIG. 3.

FIG. 4 shows, by way of example, a simple, single-pole temperature-dependent switch 63, which has a base electrode 81, which is encapsulated by injection molding with a supporting part 82 consisting of plastic, on which a cover electrode 83 rests, which is held via a hot-compressed rim 84 of the supporting part 82.

The cover electrode 83 and the base electrode 81 are provided with the external terminals 72 and 73, respectively.

The temperature-dependent switching mechanism 76, which in the present case comprises a spring tongue 85 consisting of a bimetallic material, is arranged in the interior of the housing of the switch 63 thus formed.

The spring tongue 85 bears a moveable contact part 86 on its free end 87. The moveable contact part 86 interacts with a forward curvature 88 of the base electrode 81. This forward curvature 88 acts as stationary contact part, with the result that the contact part 86 and the forward curvature form a switching contact.

At its rear end 89, the spring tongue 85 is connected to the cover electrode 83 via an intermediate part 91.

When the temperature in the interior of the switch 63 increases beyond the response temperature of the spring tongue 85, said spring tongue moves its free end 87 upwards in FIG. 4, with the result that the moveable contact part 86 is lifted off from the forward curvature 88. The arc thus produced is quenched by the triac 62 in the manner described.

Figure 5:
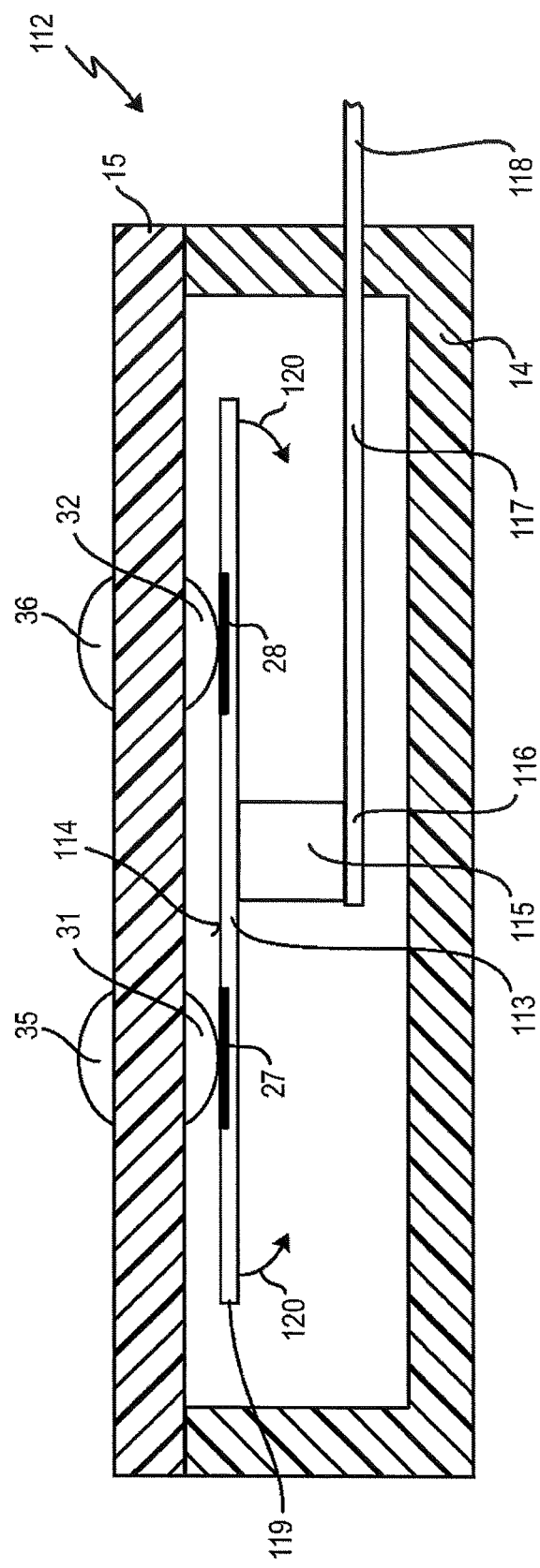
FIG. 5 shows a schematic longitudinal section (not true to scale) through a second embodiment of the temperature-dependent switch, as can be used in the novel thermal protection circuit shown in FIG. 2.

FIG. 5 shows in a depiction as in FIG. 1 a further temperature-dependent switch 112, which can be used in the thermal protection circuit 42 in FIG. 2. Switch 112 comprises like switch 10 an upper part 15 at which are internally provided said two stationary contacts 31, 32, which are connected to said two external terminals 35, 36.

The temperature-dependent switching mechanism 11 comprises a bimetallic snap-action disk 113 having on its upper side 114 embodied said two counter contacts 27, 28, which in the simplest case are provided by the upper side 114 itself, because bimetallic snap-action disc 113 is itself electrically conductive. The bimetallic snap-action disc 113 as a spring part here takes over also the task of the contact plate 24, and is therefore also the current transfer element.

The bimetallic snap-action disc 113 is centrically connected to an inner end 116 of an electrically conductive support electrode 117 by an electrically conductive bolt 115, the outer end 118 of the support electrode being connected to the control line 50 in FIG. 2. In this embodiment, the lower part 14 as well as the upper part 15 is produced from insulating material.

If to the contrary the lower part 14 is electrically conductive, bolt 116 can be directly connected below at the inner bottom of lower part 14, such that lower part 14 again can be used for the permanent electrically connection to control input 49.

When bimetallic snap-action disc 113 heats up beyond its response temperature, its rim 119 moves downwards in FIG. 6, as is indicated by arrow 120. During this movement, counter contacts 27, 28 are moved away from stationary contacts 31, 32, such that arcs form which, however, are quickly quenched in the manner described above, by semiconductor valve 41.

Therefore, what is claimed is:

1. A thermal protection circuit having two electrical connection terminals for connecting a device to be protected, including:
    a temperature-dependent switch comprising a temperature-dependent switching mechanism, two stationary contacts which are connected to the connection terminals, and a current transfer element,
    said current transfer element being arranged on the switching mechanism, being moved by the switching mechanism and, comprising two counter contacts,
    said counter contacts being electrically connected to one another, being in temperature-dependent bearing contact with the two stationary contacts, and in this state connecting said stationary contacts electrically to one another,
    and including a controllable semiconductor valve for AC voltage having two current terminals and a control input,
    each of the two current terminals being connected to one of the two connection terminals, and the control input being electrically connected to the counter contacts at the current transfer element via the switching mechanism at least when the temperature-dependent switch is closed;
    wherein the temperature-dependent switching mechanism comprises a spring part, which bears the current transfer element, is electrically conductively connected to the current transfer element, and is electrically connected to the control input at least when the temperature-dependent switch is closed;
    wherein the temperature-dependent switch comprises a housing, which housing accommodates the switching mechanism and has a lower part as well as an upper part, said upper part comprising an inner side, with the stationary contacts being arranged on said inner side; and further
    wherein the spring part is a bimetallic snap-action disc supported on the lower part at least when the temperature-dependent switch is closed.

2. The thermal protection circuit of claim 1, wherein the controllable semiconductor valve functions in the manner of a triac.

3. The thermal protection circuit of claim 2, wherein the controllable semiconductor valve comprises a triac.

4. The thermal protection circuit according to claim 1, wherein the lower part is electrically conductive.

5. The thermal protection circuit according to claim 4, wherein the spring part is permanently electrically connected to the lower part.

6. The thermal protection circuit according to claim 1, wherein a self-holding resistor is connected between the stationary contacts.

7. The thermal protection circuit according to claim 1, wherein a heating resistor is connected between one of the two stationary contacts and the associated connection terminal.

8. The thermal protection circuit according to claim 1, wherein the current transfer element is an electrically conductive contact plate, on which the two counter contacts are arranged, which counter contacts are electrically conductively connected to one another via the contact plate, wherein the contact plate is electrically conductively connected to the switching mechanism.

9. The thermal protection circuit according to claim 1, wherein the current transfer element is an electrically conductive spring part, on which spring part the two counter contacts are arranged, which counter contacts are electrically conductively connected to one another via the spring part.

10. The thermal protection circuit according to claim 9, wherein said spring part is a bimetallic snap-action disc.

11. The thermal protection circuit according to claim 9, wherein said spring part is permanently connected to said control input.

12. An electrical device comprising a thermal protection circuit as set forth in claim 1.

13. The electrical device according to claim 12, wherein said semiconductor valve is connected to the temperature-dependent switch in a releasable manner.

14. A thermal protection circuit having two electrical connection terminals for connecting a device to be protected, comprising:
two temperature-dependent switches, each having two external terminals and a temperature-dependent switching mechanism, each switching mechanism producing or opening, in temperature-dependent fashion, an electrical connection between said two external terminals, wherein one external terminal of each switch is connected to one of the connection terminals or itself acts as connection terminal, and the respective other external terminals of the switches are connected to one another,
said thermal protection circuit comprising a controllable semiconductor valve for AC voltage having two current terminals and a control input, wherein each of the two current terminals is connected to one of the connection terminals, and the control input is electrically connected to those external terminals that are connected to one another.

15. An electrical device comprising a thermal protection circuit as set forth in claim 14.

16. A thermal protection circuit having two electrical connection terminals for connecting a device to be protected, including:
a temperature-dependent switch comprising a temperature-dependent switching mechanism, two stationary contacts which are connected to the connection terminals, and a current transfer element,
said current transfer element being arranged on the switching mechanism, being moved by the switching mechanism and, comprising two counter contacts,
said counter contacts being electrically connected to one another, being in temperature-dependent bearing contact with the two stationary contacts, and in this state connecting said stationary contacts electrically to one another,
and including a controllable semiconductor valve for AC voltage having two current terminals and a control input, each of the two current terminals being connected to one of the two connection terminals, and the control input being electrically connected to the counter contacts at the current transfer element via the switching mechanism at least when the temperature-dependent switch is closed,
wherein the temperature-dependent switching mechanism comprises a spring part, which bears the current transfer element, is electrically conductively connected to the current transfer element, and is electrically connected to the control input at least when the temperature-dependent switch is closed,
wherein the temperature-dependent switch comprises a housing, which housing accommodates the switching mechanism and has a lower part as well as an upper part, said upper part comprising an inner side, with the stationary contacts being arranged on said inner side, and further
wherein the spring part is a spring snap-action disc supported on the lower part at least when the temperature-dependent switch is closed, wherein a bimetallic snap-action disc is provided which lifts off the current transfer element from the stationary contacts above a switching temperature of said bimetallic snap-action disc.

17. The thermal protection circuit of claim 16, wherein the controllable semiconductor valve functions in the manner of a triac.

18. The thermal protection circuit of claim 17, wherein the controllable semiconductor valve comprises a triac.

19. The thermal protection circuit according to claim 16, wherein the lower part is electrically conductive.

20. The thermal protection circuit according to claim 16, wherein the spring part is permanently electrically connected to the lower part.

21. The thermal protection circuit according to claim 16, wherein a self-holding resistor is connected between the stationary contacts.

22. The thermal protection circuit according to claim 16, wherein a heating resistor is connected between one of the two stationary contacts and the associated connection terminal.

23. The thermal protection circuit according to claim 16, wherein the current transfer element is an electrically conductive contact plate, on which the two counter contacts are arranged, which counter contacts are electrically conductively connected to one another via the contact plate, wherein the contact plate is electrically conductively connected to the switching mechanism.

24. The thermal protection circuit according to claim 16, wherein the current transfer element is an electrically conductive spring part, on which spring part the two counter contacts are arranged, which counter contacts are electrically conductively connected to one another via the spring part.

25. The thermal protection circuit according to claim 24, wherein said spring part is a bimetallic snap-action disc.

26. The thermal protection circuit according to claim 24, wherein said spring part is permanently connected to said control input.

27. An electrical device comprising a thermal protection circuit as set forth in claim 16.

28. The electrical device according to claim 27, wherein said semiconductor valve is connected to the temperature-dependent switch in a releasable manner.

* * * * *

UNITED STATES PATENT AND TRADEMARK OFFICE
CERTIFICATE OF CORRECTION

Page 1 of 1

PATENT NO.         : 9,263,879 B2
APPLICATION NO.    : 14/101638
DATED              : February 16, 2016
INVENTOR(S)        : Liehr et al.

It is certified that error appears in the above-identified patent and that said Letters Patent is hereby corrected as shown below:

On the title page, Item (30)
"20 2013 100 509 U" should read -- 20 2013 100 509 --.

In the claims

Column 16, line 32, Claim 20
"claim 16," should read -- claim 19, --.

Signed and Sealed this
Seventh Day of June, 2016

Michelle K. Lee
*Director of the United States Patent and Trademark Office*